United States Patent [19]

Frost

[11] 4,326,389
[45] Apr. 27, 1982

[54] FROZEN DESSERT MAKER

[76] Inventor: Edmund C. Frost, 885 D Rever Village Ct., Centerville, Ohio 45459

[21] Appl. No.: 142,797

[22] Filed: Apr. 22, 1980

[51] Int. Cl.³ .............................................. A73G 9/00
[52] U.S. Cl. ..................................... 62/342; 62/457; 74/390; 366/209
[58] Field of Search ................ 62/342, 343, 371, 357; 366/208, 209, 219; 68/171, 172; 74/390, 804; 165/104 S

[56] References Cited

U.S. PATENT DOCUMENTS

| | | | |
|---|---|---|---|
| 2,690,653 | 10/1954 | Kleist | 165/104 S X |
| 2,762,613 | 9/1956 | Burton | 62/342 X |
| 3,087,708 | 4/1963 | Sims | 62/342 X |
| 3,282,068 | 11/1966 | Cain | 62/457 |
| 3,346,241 | 10/1967 | Schubert | 366/209 |
| 4,109,319 | 8/1978 | Brandt | 366/219 |

Primary Examiner—William E. Tapolcai, Jr.
Attorney, Agent, or Firm—Biebel, French & Nauman

[57] ABSTRACT

An improved frozen dessert maker of the type having a motor with an output shaft mounted within a base, a can for containing dessert mix to be frozen, a dasher mounted within the can, and a top for sealing the can and supporting the dasher includes a plurality of coolant packs containing a coolant positioned concentrically about the can and secured to the can by means of a strap having a draw pull catch and strike, and a drive train wherein a second shaft parallel to the output shaft orbits about the output shaft. A lower stud which extends upwardly from the base acts as a bearing surface for an upper stud which extends downwardly from a platform supporting the can and coolant packs so that rotation of the output shaft of the motor causes the upper stud to move reciprocally against the lower stud causing the can and packs to move in a somewhat circular path about the axis of the second shaft with a reciprocating rotational motion superimposed on the circular path. Each of the packs contains a plurality of vanes which act as a heat sink and promote circulation of coolant contained within the packs to hasten the cooling action of the packs.

13 Claims, 15 Drawing Figures

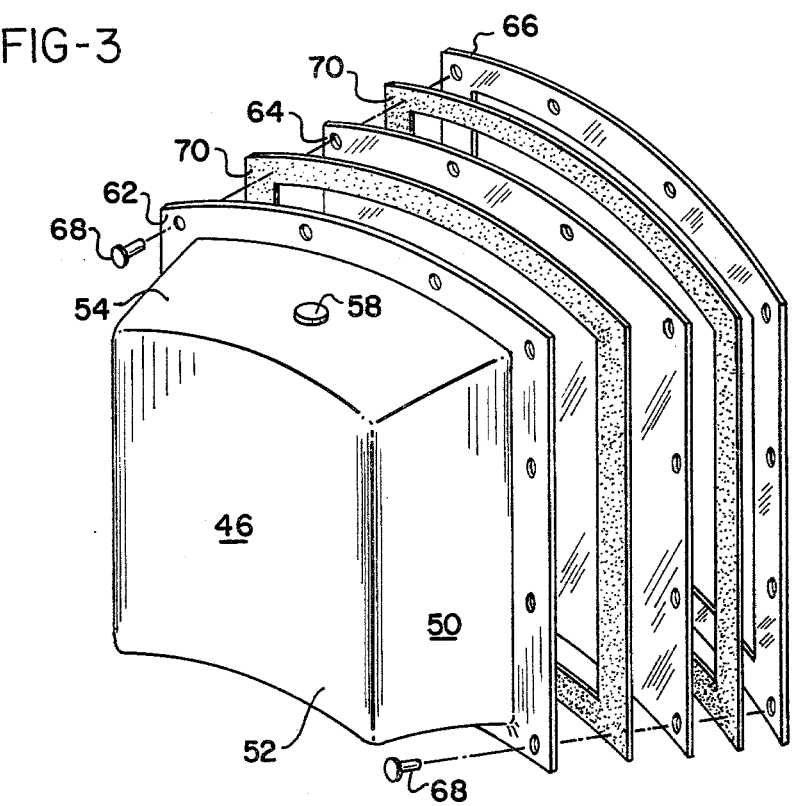

FROZEN DESSERT MAKER

BACKGROUND OF THE INVENTION

1. Field of the Invention

The present invention relates to frozen dessert makers, and more particularly to dessert makers in which a dessert mix is stirred and cooled within a container.

2. Prior Art

Frozen dessert makers, such as those used to make ice cream and other frozen dairy desserts, are well-known and consist of a can for containing the dessert mix to be frozen, a stirring means for agitating the mix within the can, and a larger container containing an icy brine bath within which the can is placed. The dessert mix is agitated within the can it is cooled by the icy brine bath. As the ice in the bath melts, the agitated mix can be cooled to a temperature below that of the freezing point of the ice due to the latent heat of fusion of the icy brine bath.

In order to increase the rate of heat transfer from the dessert mix within the can to the icy brine solution, it is commonly known to rotate the can within the brine solution. This serves to agitate the brine solution and thereby eliminate any temperature gradient from the surface of the can to the solution which would reduce heat flow from the can.

Similarly, the contents of the can must be agitated so that ice crystals which form on the inner surface of the can may slice off and mix with the dessert mix and thereby maintain a uniform temperature of the contents. Since heat is generated by the mixing of the contents of the can, it is desirable to increase the rate of heat flow from the dessert mix within the can to the brine solution in order to decrease the time needed to make the frozen dessert mix.

The frozen dessert makers presently used possess distinct disadvantages. It is necessary to make an icy brine solution each time a frozen dessert is to be made. After the frozen dessert is made, the icy brine solution must be emptied from the dessert maker, resulting in a waste of water and salt and possibly creating problems in locating a proper place to dispose of the brine solution. In addition, frozen dessert makers commonly used agitate this coolant, somewhat due to the rotation of the can, but the coolant is not circulated sufficiently, resulting in an increased time needed to freeze the dessert mix due to temperature gradients within the brine bath.

SUMMARY OF THE INVENTION

The present invention provides an improved frozen dessert maker in which the use and concomitant problems of an icy brine solution are eliminated. The invention includes sealed coolant packs containing a coolant such as propylene glycol shaped to be fitted concentrically about the can containing the dessert mix. A strap and buckle arrangement is used to secure the coolant packs as uniformly snugly against the can as possible. In this fashion, the coolant packs can be prepared for the dessert making operation by being placed in a home freezer for a length of time sufficient to cool the contents to an icy slurry, then strapping them around the can of dessert mix. After the dessert making process is completed, the coolant packs can be removed and stored until needed.

The invention employs a standard motor and output shaft to agitate the dessert mix and the coolant slurry. The output shaft powers a drive train having a second shaft, parallel to the output shaft, which orbits about the output shaft. A circular platform which supports the can and the packs is mounted rotatably on the drive train, and the second shaft extends through a central hole in the platform.

The second shaft extends up through the central hole in the platform and through a hole in the center of the floor of the can. The second shaft terminates in a head bolt on which is mounted the dasher. A flanged bolt, O-ring and inverted cup with a threaded bottom provide a water-tight seal in the bottom of the can through which passes the second shaft so that the second shaft and the dasher may rotate with respect to the can during operation. In addition, the inverted cup centers the can on the platform.

The platform has an upper stud which extends downwardly and engages a lower stud which extends upwardly from a basin positioned below the platform to collect condensation from the can and packs. As the drive shaft rotates the drive train and the second shaft orbits about the drive shaft, the upper stud moves against the lower stud, which acts as a bearing surface and prevents movement of the platform, coolant packs and can with the dasher, thereby causing the dasher to rotate relative to the can to stir the mix to promote freezing. The resultant movement of the platform, can and coolant packs is somewhat circular with a reciprocating rotational movement superimposed upon it.

In this fashion, the coolant slurry within the packs is best agitated. To enhance the flow of the coolant slurry within the packs, and thus to increase the flow of heat from the dessert mix, U-shaped vanes are mounted within the coolant packs on a wall of the pack adjacent the can. The vanes also act as a heat sink to conduct heat away from the can rapidly.

The can and platform can be removed from the dessert maker easily to facilitate cleaning of the components. The lower end of the second shaft is threaded into a block having cruciform members which rests in an upper cup having lugs which are positioned to prevent movement of the block relative to the cup. The upper cup is nested within a lower cup. The output shaft of the motor is fixedly journaled in a first hole located off-center in the lower cup and a second hole in registry with the first hole located in the upper cup. Thus to remove the can and packs from the drive train, the operator need only lift the can and packs upwardly to disengage the block from the lugs in the upper cup.

Although not necessary for cleaning, the platform can be removed from the dessert maker by lifting it up from the drive train. The platform, which has a central hole sized to allow the second shaft to pass through, has a downturned lip positioned about the periphery of the central hole which matingly engages the upper cup.

Accordingly, it is an object of this invention to provide a frozen dessert maker in which the coolant is sealed in coolant packs which can be stored and reused; to provide a frozen dessert maker in which the coolant within the coolant packs is circulated during the dessert making operation; and to provide a frozen dessert maker which can be disassembled easily so that the component parts may be cleaned.

Other objects and advantages of the invention will be apparent from the following description, the accompanying drawings and the appended claims.

BRIEF DESCRIPTION OF THE DRAWINGS

FIG. 3 is an exploded view of one of the coolant packs in FIGS. 1 and 2;

DETAILED DESCRIPTION OF THE PREFERRED EMBODIMENT

Figure 1:
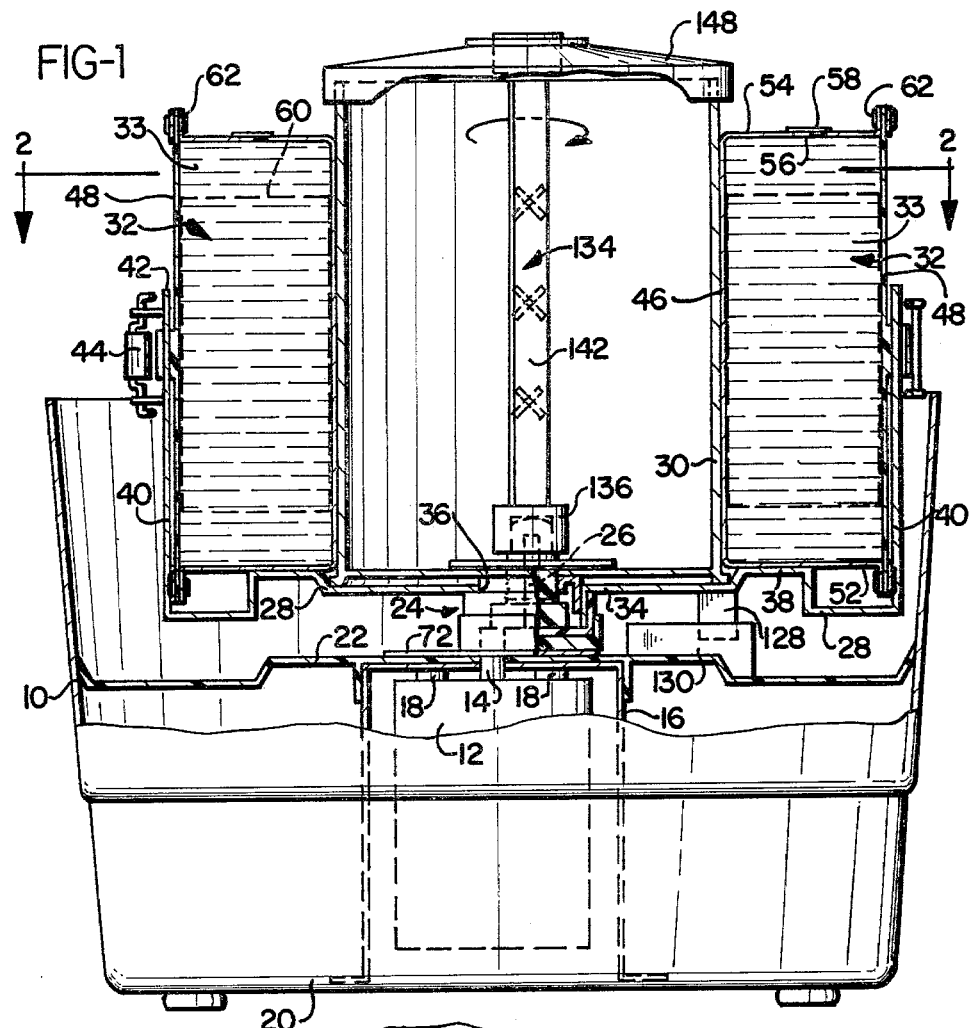
FIG. 1 is a side elevation of a dessert maker embodying the invention, partially cut away.

The frozen dessert maker of the present invention shown in FIG. 1 includes a base shell 10 which houses a standard electric motor 12 having an output shaft 14. The motor 12 is mounted to support members 16 by means of vibration damping connections 18, such as a bolt and rubber gasket, well-known in the art. The support members 16 are mounted to the floor 20 of the shell 10 and also support a basin 22 which is used to collect condensation formed during the freezing process.

The output shaft 14 powers a drive train, generally designated 24, which includes a second shaft 26. The drive train 24 supports a platform 28 which in turn supports a can 30 for holding the dessert mix and coolant packs 32 containing liquid coolant 33. The platform 28 is circular in shape and has a dish portion 34 with a central opening 36, through which passes the drive train 24, and a raised ridge 38 which supports the coolant packs 32. A raised wedge 39 extends upward from the platform 28 in between two coolant packs 32 to prevent movement of the packs with respect to the platform.

Figure 2:
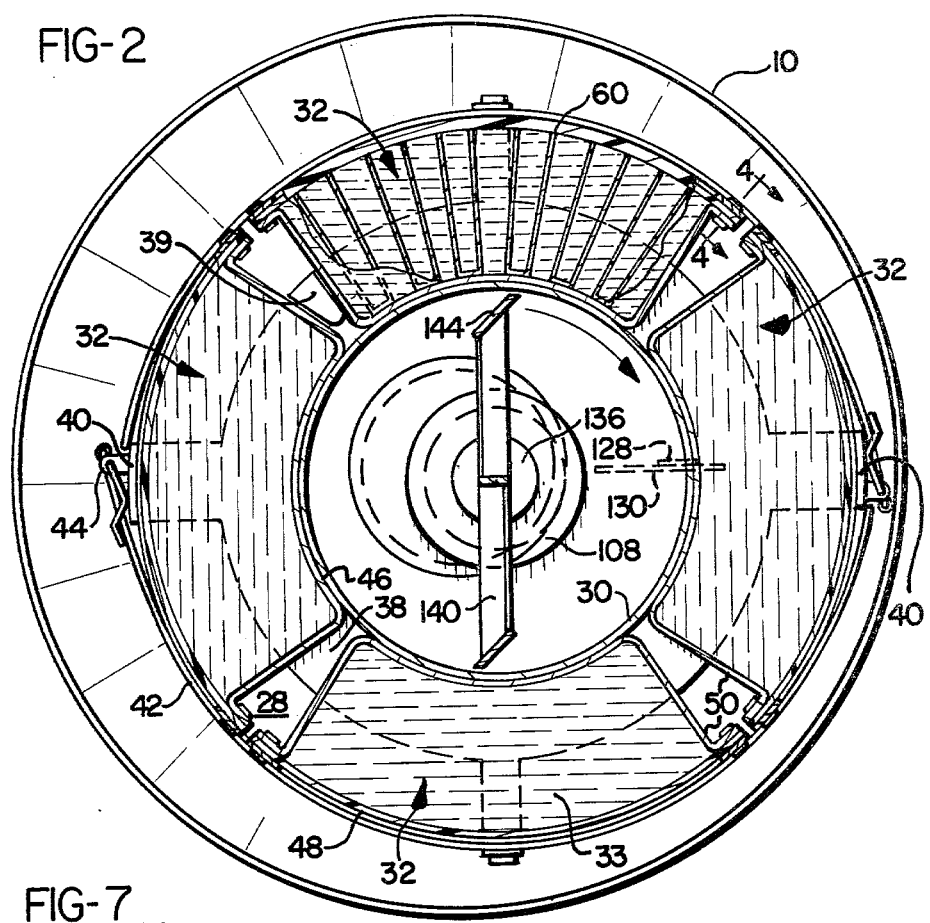
FIG. 2 is a section taken at line 2—2 of FIG. 1.

As shown in FIGS. 1 and 2, the platform 28 includes arms 40 which extend upwardly from its outer periphery. The arms 40 support a pair of straps 42 which hold the coolant packs 32 against the can 30. Each strap is tightened by means of a draw pull catch and strike 44.

As best shown in FIG. 2, the coolant packs 32 are generally wedge-shaped and have an inner concave face 46, an outer convex face 48, and a pair of side walls 50. The wedge shape of the coolant packs 32 allows them to be arranged concentrically about the can 30 and held in abutting relationship by the strap 42. The coolant packs 32 also include a bottom 52 and a top 54 having an access opening 56 sealed with a press-fit cap 58. It is essential that the inner concave face 46 be ground to increase the area of contact with the can 30 to achieve a maximum rate of heat transfer.

A plurality of U-shaped vanes are mounted to extend between the inner and outer walls of each coolant pack 32. The vanes 60 are made of aluminum and are cemented to the inner concave face 46 by means of a heat conducting epoxy such as Delta Bond 152-K-A made by Wakefield Engineering Co., Wakefield, Massachusetts. The vanes 60 are of shorter vertical dimensions than the coolant pack 32 to provide spaces in the pack above and below the vanes as shown in FIG. 1.

Figure 4:
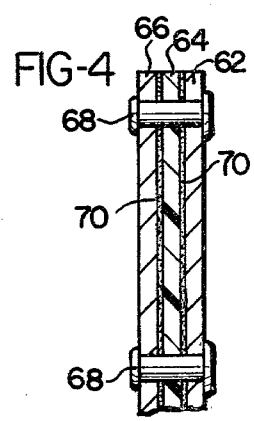
FIG. 4 is a fragmentary section on the line 4—4 of FIG. 2.

As shown in FIGS. 2 and 3, the outer convex face 48 of the coolant pack 32 is supported by a flange 62 which extends about the edges of the top 54, bottom 52 and side walls 50. The outer convex face 48, best shown in FIGS. 3 and 4, consists of a substantially rectangular sheet 64 of a plastic material such as a polyester, and a frame 66. The sheet 64 completely covers a chamber formed by the top 54, bottom 52, side walls 50, and inner concave face 46 and is clamped between the flange 62 and the frame 66 by means of pop rivets 68. In order to insure a leak-proof seal between the sheet 64 and the flange 62, gaskets 70 are interposed between the sheet 64 and the flange 62, and the sheet and the frame 66.

Figure 5:
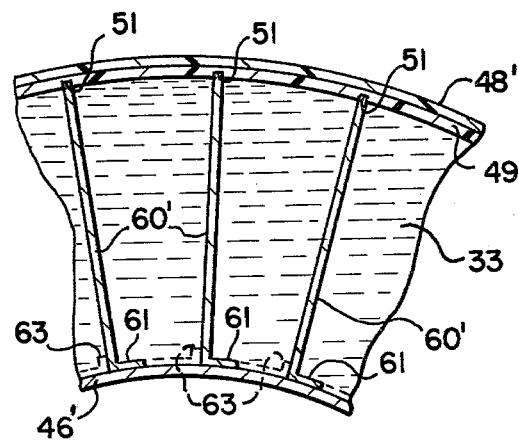
FIG. 5 is a section of another embodiment of a coolant pack taken at line 2—2 of FIG. 1.
Figure 6:
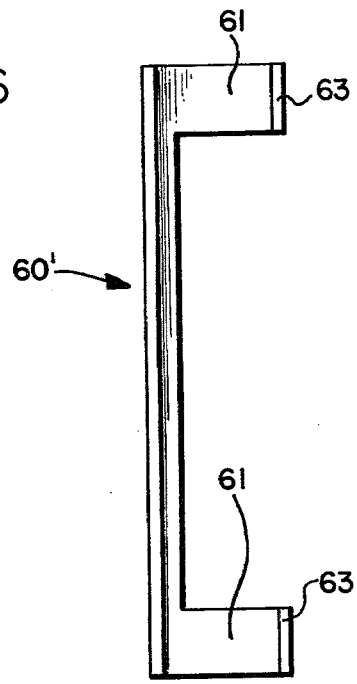
FIG. 6 is an end view of a vane of the embodiment of FIG. 5.

In an alternate embodiment of a coolant pack 32', shown in FIGS. 5 and 6, the vanes 60' are L-shaped, each having a U-shaped foot 61 at each end which terminates in upturned toes 63. The toes 63 of a vane 60' abut the next adjacent vane to provide spacing and prevent shifting of the vanes within the coolant packs 32'. A band 49 of fiber glass has slots 51 within which are fitted the outer portions of the vanes 60'. The band 49 fits concentrically within the outer convex face 48' of the coolant pack 32'. Thus, vanes 60' can be mounted within the coolant packs 32' without adhesive and the outer convex face 48' is protected from being punctured by the vanes. The U-shape of the foot 61 is desirable so that direct contact between the inner concave face 46' and the coolant can be maximized.

In the preferred embodiment, the inner concave face 46, top 54, bottom 52 and flange 62 are integral, that is, they are formed from a single sheet of aluminum. Similarly, the frame 66 can be made from aluminum, which is desirable because of its lightness and resistance to corrosion.

Figure 8:
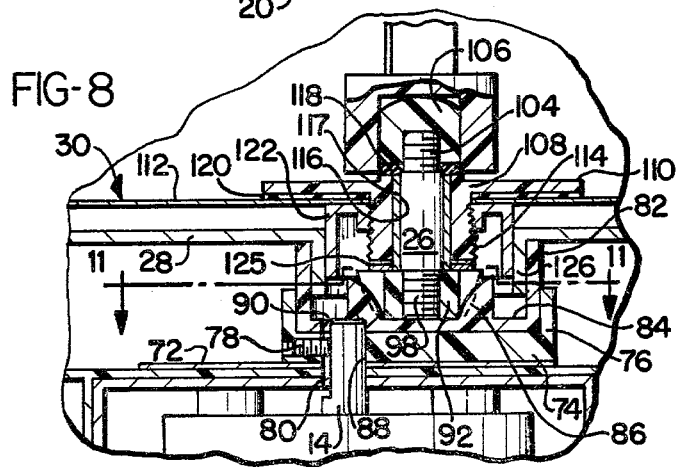
FIG. 8 is an enlarged fragmentary section of the drive train, taken on the line 8—8 of FIG. 11.
Figure 9:
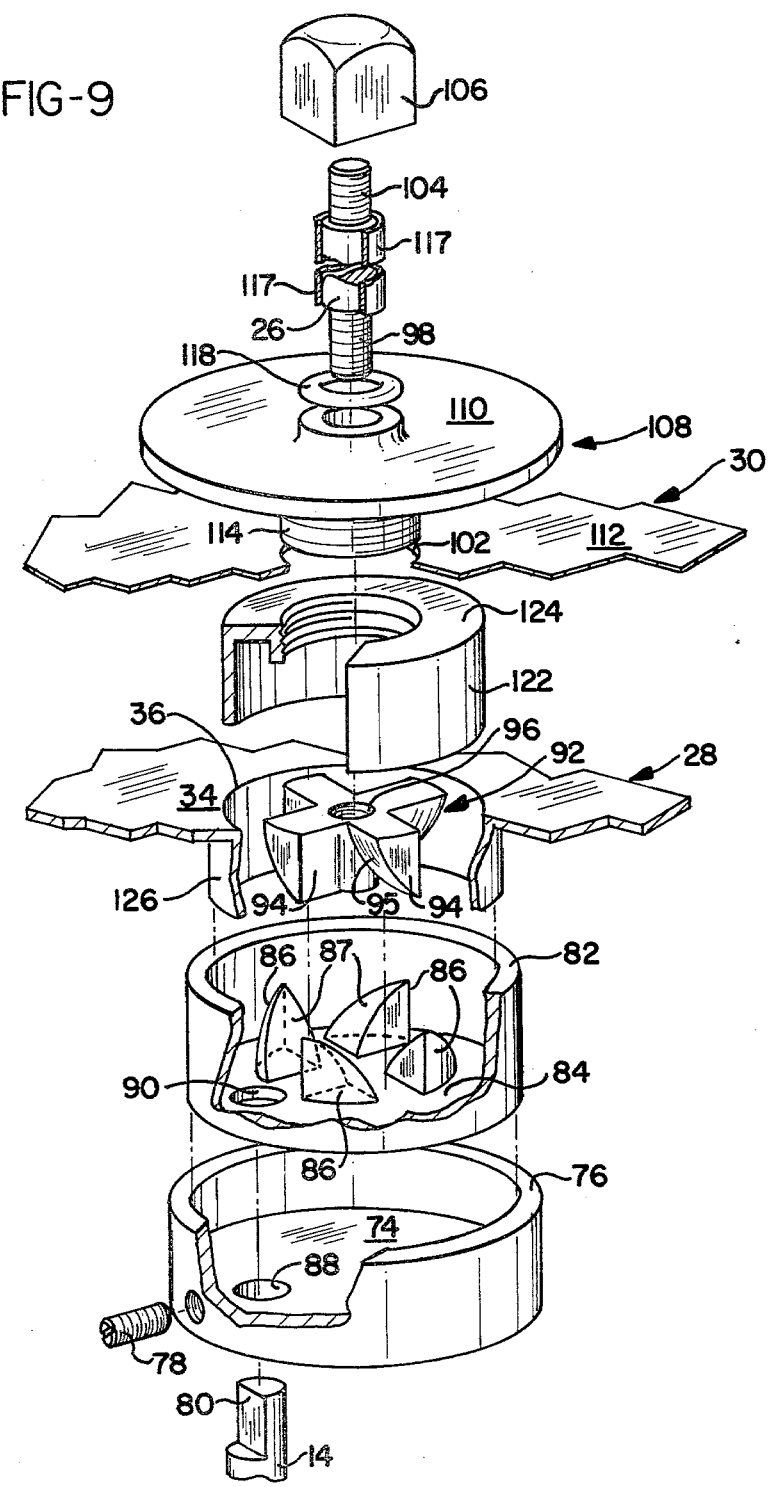
FIG. 9 is an exploded view of the drive train of FIG. 8.

As best shown in FIGS. 8 and 9, the drive train 24 rests upon a friction plate 72 and supports the platform 28, can 30, and coolant packs 32. The output shaft 14 of the motor 12 extends through the support member 16 and basin 22 and is journaled into the lower floor 74 of a lower cup 76. The output shaft 14 is prevented from rotating relative to the lower cup 76 by means of a set screw 78 engaging a flat surface 80 on the shaft 14.

Nested within the lower cup 76, and held by a cement such as epoxy, is an upper cup 82 having an upper floor 84 on which is formed raised lugs 86 having arcuate upper surfaces 87. The lower cup 76 and upper cup 82 have a first hole 88 and a second hole 90, respectively, in which the output shaft 14 is inserted. The first and second holes 88, 90 are off-center and are in registry with each other.

A block 92 having cruciform members 94 with lower arcuate surfaces 95 rests on the upper floor 84 of the upper cup 82. The block 92 is prevented from rotating relative to the upper cup 82 by the raised lugs 86 which project between the cruciform members 94. The block 92 has a central opening 96 which is threaded to receive the threaded lower end 98 of the second shaft 26.

The second shaft 26 extends up from the block 92 through the central opening 36 of the platform 28 and an opening 102 in the can 30. The second shaft 26 has an upper end 104 which is threaded to receive a head bolt 106.

A water-proof seal is provided for the opening 102 in the can 30 by means of a flanged bolt 108 comprising a flange member 110 which rests on the floor 112 of the can 30 and a threaded member 114 which passes through the opening 102. The threaded member 114 and flange member 110 of the flanged bolt have a central passage 116 carrying a bushing 117 which allows the second shaft 26 to pass therethrough. A nitrile gasket 118 is provided between the head bolt 106 and the flange member 110 to prevent leakage of the contents of the can 30 into the central passage 116. A flat nitrile washer 120 is provided between the flange member 110 and the floor 112 to prevent leakage of the contents of the can 30 into the opening 102.

The flanged bolt 108 is clamped to the floor 112 of the can 30 by means of an inverted cup member 122 having a threaded bottom 124 which engages the threaded member 114 of the flanged bolt 108. In this fashion, the floor 112 is clamped between the flange member 110 and the bottom 124 and the inverted cup member 122 centers the can 30 on the platform 28. The threaded member 114 is separated from the block 92 by washers 125 which facilitate movement of the threaded member relative to the block.

The platform 28, which supports the can 30 and coolant packs 32, is centered about the second shaft 26 by means of a downturned lip 126 which extends about the periphery of the central hole 36 located in the dish portion 34. The downturned lip 126 is nested within the upper cup 82 and positioned between the upper cup and the inverted cup member 122. The tolerance between the downturned lip 126 of the platform 28 and the upper cup 82 is sufficient to allow free rotation of the platform relative to the upper cup.

In order to effect the desired motion of the can 30 and coolant packs 32, an upper stud 128 is attached to the dish portion 34 of the platform 28 and extends downwardly toward the basin 22. A lower stud 130 extends upwardly from the basin 22 and has an upper edge 132 which is below the lowest portion of the platform 28. The lower stud 130 and upper stud 128 are located at approximately the same radial distance from the output shaft 14 so that the upper stud may slidably engage the lower stud during operation of the dessert maker.

Figure 7:
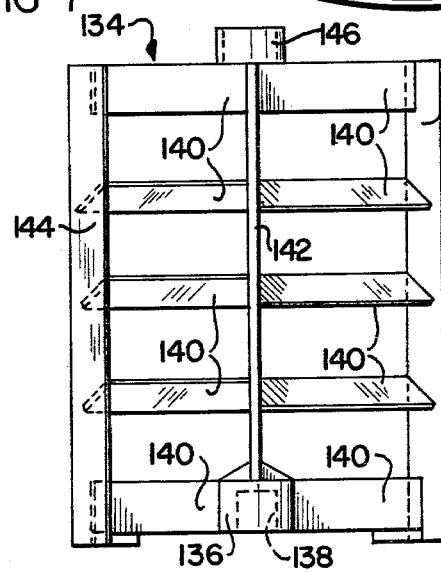
FIG. 7 is an elevation of the dasher used in the dessert maker of FIGS. 1 and 2.

As best shown in FIGS. 2 and 7, a dasher 134 has a base member 136 with a recess 138 shaped to receive the head bolt 106 of the drive train 24. The head bolt 106 is faceted so that rotation of the second shaft 26 rotates the dasher 134. The dasher 134 has blades 140 extending outwardly from a central shaft 142 and held in position by stiffeners 144 disposed at an angle to the can 30 so that the cooled mix near the wall of the can is forced toward the center of the can. The dasher 134 has an upper member 146 which is journaled within a lid 148 and thereby is prevented from wobbling while mounted on the head bolt 106.

To initiate the operation of the frozen dessert maker of the present invention, it is necessary first to fill the coolant packs 32 by removing the cap 58 from the access opening 56 in the top 54. A coolant, such as an aqueous solution of ethylene glycol, is poured into the coolant packs 32 through the access opening 56, the cap 58 is refitted into the access opening, and the coolant packs 32 are placed in a home freezer to cool. Once the coolant packs have been filled with a coolant mixture, they may be reused indefinitely without need of continued emptying and refilling of the coolant packs.

The coolant packs are chilled until the coolant has a consistency of a slurry. The coolant must be maintained as a slurry so that it may circulate about the vanes 60 within the coolant packs 32. The coolant packs 32 containing the coolant slurry are then placed concentrically about the can 30 and urged against the can by each straps 42. By throwing the draw pull catch and strike 44 on the straps 42, the coolant packs 32 are firmly maintained about the can 30, with the clamping thrust of straps 42 being transferred by the vanes 60 to force the inner surfaces 46 of the packs against the can, and there is no movement of the can relative to the coolant packs during operation. This arrangement is best shown in FIG. 2.

After the coolant packs 32 have been secured to the can 30, the lid 148 is removed from the can and dessert mix is added. The lid 148 is again placed on the can 30 so that the upper member 146 of the dasher 134 is secured therein. The frozen dessert maker is now ready for operation.

Figure 11:
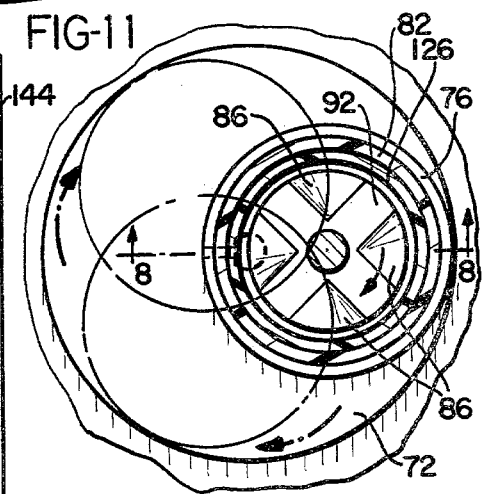
FIG. 11 is a somewhat diagrammatic view taken on the line 11—11 of FIG. 8, showing in phantom the movement of the drive train about the output shaft of the motor.

When the motor 12 is activated to begin the dessert making process, the output shaft 14 is rotated, thereby rotating the lower cup 76 and upper cup 82 about a central axis to the output shaft. The second shaft 26, which is held within the upper cup 82 by the block 92, begins to orbit about the output shaft 14. The resultant movement of the drive train 24 is shown in FIG. 11. The dashed lines represent the path of the lower cup 76 about the output shaft 14.

As the lower cup 76, upper cup 82, block 92 and second shaft 26 orbit about the output shaft 14, the platform 28, which is rotatably supported by the upper cup, is also caused to orbit about the output shaft. However, the upper stud 128 of the platform 28 engages the lower stud 130 of the basin 22, thereby preventing circular movement of the platform—and hence the can 30 and coolant packs 32—about the output shaft 14.

Figure 10A:
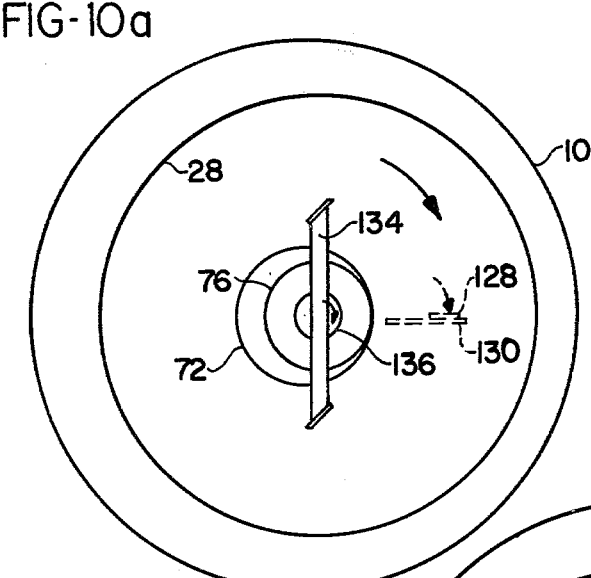
FIGS. 10a, 10b, and 10c are schematics of the operation of the dessert maker of FIGS. 1 and 9 showing the relative movements of the dasher and studs.
Figure 10B:
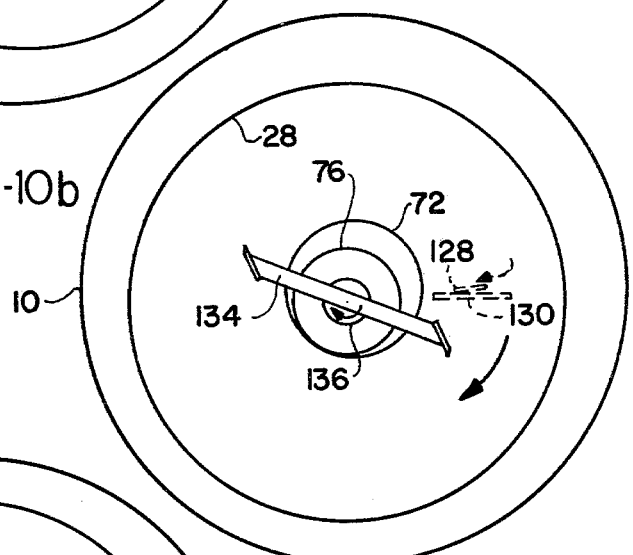
Figure 10C:
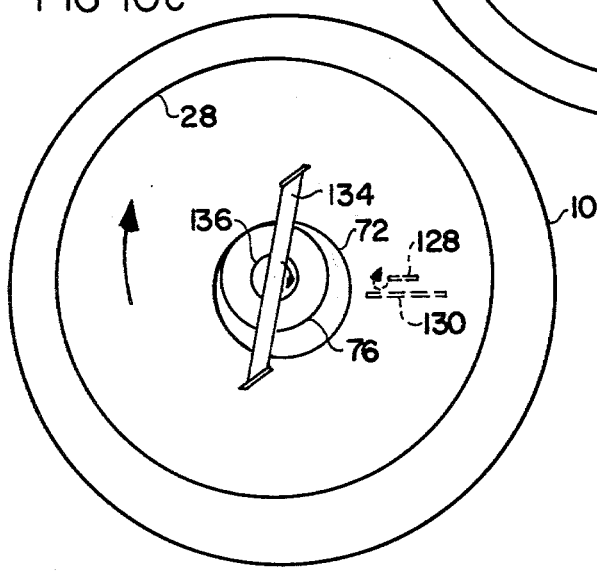

The movement of the upper stud 128 against the lower stud 130 during rotation of the output shaft 14, and the effect that movement has on the path of the platform 28, coolant packs 32 and can 30, is shown in FIGS. 10a, 10b and 10c. In FIG. 10a, the upper stud 128 has initially contacted the lower stud 130 as the platform 28 is rotated by the output shaft 14. As the second shaft 26 continues to rotate about the output shaft 14, the dasher 134, which is rigidly connected to the second shaft, continues to rotate with the second shaft, but the platform 28, shown schematically in FIG. 10, is prevented from further rotation by the interaction of the upper stud 128 and lower stud 130.

As the second shaft 26 continues to rotate about the output shaft 14, the platform 28 is caused to rotate with respect to the upper cup 82 and become displaced to the left, as shown in FIG. 10b. Since the dasher 134 is fixed with respect to second shaft 26, and the platform 28 which carries the can 30 and coolant packs 32 rotates relative to the upper cup 82 and the second shaft 26, the dasher rotates within the can as the output shaft 14 rotates.

The end of a cycle of rotation is shown in FIG. 10c. The output shaft has now rotated approximately 270° from the lower stud 130 and the platform 28 has been displaced upwardly so that the upper stud 128 moves away from the lower stud. At the end of the cycle, the upper stud 128 again contacts the lower stud 130. Thus, the platform 28—and hence the can 30 and coolant packs 32—appears to describe a somewhat circular path with a reciprocating rotational movement superimposed thereon. This movement serves both to agitate the coolant slurry within the coolant packs 32 and to effect rotation of the dasher 134 relative to the can 30, thereby agitating the dessert mix placed within the can. The agitation of the coolant slurry within the coolant packs is enhanced by the vanes 60, and thus the coolant slurry is maintained at a constant temperature, thereby eliminating a temperature gradient which would impede the absorption of heat by the coolant slurry from the frozen dessert mix. In addition, the aluminum vanes 60 act as a heat sink, conducting heat away from the inner concave face 46.

When the dessert mix has been frozen sufficiently, the motor 12 is shut off and the lid 148 is removed from the can 30. The frozen contents of the can 30 can then be scooped out. Alternately, the draw pull catch and strike 44 of each strap 42 can be thrown to loosen the strap, and the coolant packs 32 can be removed from the frozen dessert maker. The can 30 can be lifted up from the frozen dessert maker, thereby disengaging the block 92 from the upper cup 82. The lid 148 can then be removed and the dasher 134 removed from within the can 30. The contents of the can 30 then can be removed.

An advantage of the construction of the drive train is that the entire frozen dessert maker may be disassembled for easy cleaning. As previously mentioned, the coolant packs 32 and can 30 can be removed from the drive train simply by lifting them up out of the frozen dessert maker. The arcuate upper surfaces 87 of the raised lugs 86 permit the arcuate lower surfaces 95 of the cruciform members 94 to slide over the lugs into a locked position on the upper floor 84 when the drive train 26 is reassembled.

The platform 28, which merely rests upon the upper cup 82 of the drive train 24, similarly can be lifted up and cleaned separately. Although not necessary for cleaning, the remaining portions of the drive train 24 can be removed from the output shaft 14 by displacing the set screw 78 away from the output shaft. With the drive train 24, platform 28, can 30 and coolant packs 32 thus removed from the frozen dessert maker, the basin 22 can easily be cleaned to remove any condensation which may have deposited thereon during the cooling operation or spillage which may have occurred during the loading or unloading of the can 30.

Because of the relatively low stresses involved in the operation of the frozen dessert maker of the present invention, virtually all of the above discussed components can be fabricated from a hard plastic. However, in the preferred embodiment, the can 30, inner concave face 46, and vanes 60 are fabricated from aluminum because of its desirable heat conducting properties. To insure added life to the frozen dessert maker, it is also preferable to fabricate the second shaft 26, upper cup 82, and platform 28 from light-weight stainless steel aluminum.

Figure 12:
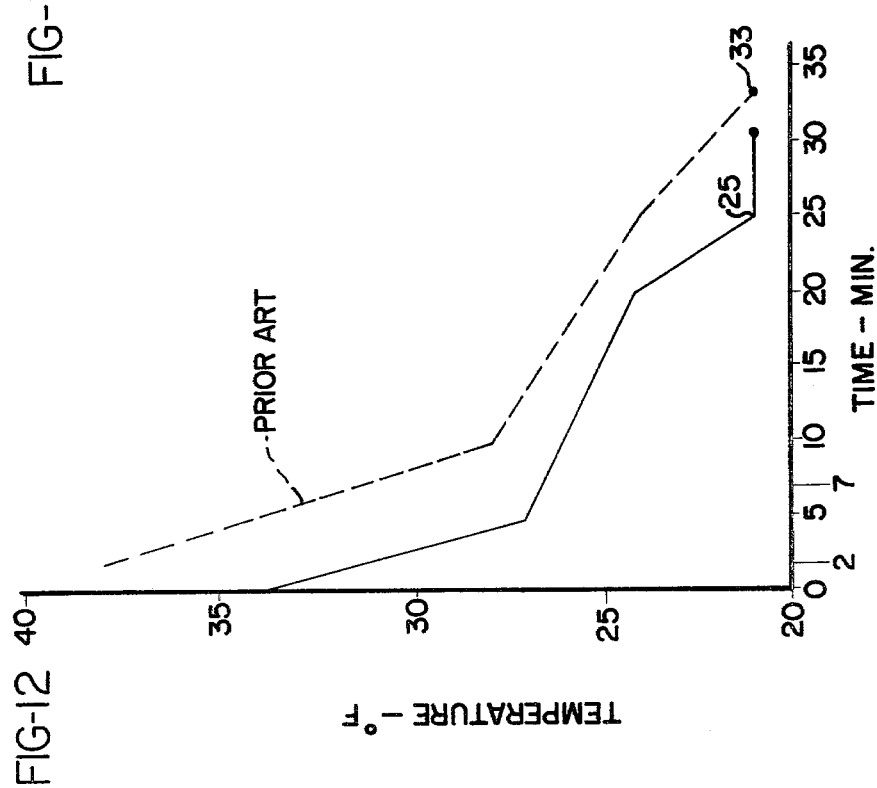
FIG. 12 is a graph in which the cooling rate of dessert mix used in the present invention is compared with that of a prior art dessert maker.

In FIG. 12, the cooling rate of the frozen dessert maker of the present invention, shown as a solid line, is compared with the cooling rate of a prior art frozen dessert maker, shown by a broken line. As shown by the broken line, the prior art frozen dessert maker, utilizing an icy brine solution which receives limited agitation from the rotating can, cooled a dessert mix of 4 percent milk from a temperature of 32° F. to 21° F. in approximately 26 minutes. The frozen dessert maker of the present invention, utilizing the same dessert mix containing 4 percent milk, cooled the mixture from a temperature of 32° F. to 21° F. in approximately 23 minutes, or 3 minutes less than the prior art frozen dessert maker.

Figure 13:
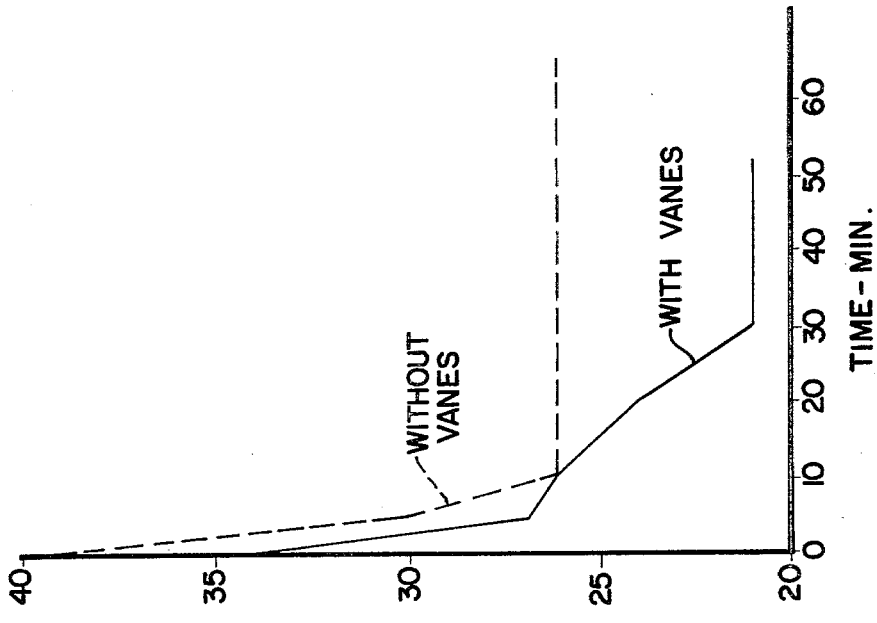
FIG. 13 is a graph in which the cooling rate of a dessert mix used in the present invention utilizing coolant packs with vanes is compared with that of the present invention in which the coolant packs did not have vanes.

The benefits of utilizing coolant packs 32 having vanes 60 is shown in the graph of FIG. 13. The broken line represents the cooling rate of the frozen dessert maker of the present invention in which the coolant packs 32 did not contain vanes 60 mounted on the inner concave face 46. The solid line represents the cooling rate of the frozen dessert maker of the present invention in which vanes 60 were utilized in the coolant packs 32. It is theorized that the vanes 60 not only promote the circulation of the coolant slurry within the coolant packs, but also act as heat sinks drawing the heat from the inner concave face 46 to a portion of the coolant pack adjacent the outer convex face 48.

While the form of apparatus herein described constitutes a preferred embodiment of this invention, it is to be understood that the invention is not limited to this precise form of apparatus, and that changes may be made therein without departing from the scope of the invention.

What is claimed is:

1. A frozen dessert maker of the type having a base, a motor carried by the base, an output shaft rotated by the motor, a drive train connected to the output shaft, a cylindrical can rotatably mounted on the drive train, and a dasher extending centrally in the can and mounted rigidly on the drive train, and further comprising:
    a plurality of coolant packs for containing a coolant slurry, each having an inner concave face and an outer convex face, positioned concentrically about the can, said inner concave face of each said pack being formed of heat conductive substantially rigid metallic material shaped to engage and conform to an exterior portion of the can;
    a plurality of substantially rigid vanes of heat conducting metallic material extending from to said inner concave face to said outer convex face of each said coolant pack; and
    means extending about said coolant packs adjacent said outer convex faces thereof for clamping said packs to the can such that said inner concave faces are urged into contact with said exterior portion of said can.

2. The frozen dessert maker of claim 1 further comprising:
    a platform rotatably mounted on the drive train and including a dish to support the can and a raised ridge to support said coolant packs; and
    a plurality of arms extending upwardly from the outer periphery of said platform for supporting said clamping means.

3. The frozen dessert maker of claim 1 wherein said vanes are L-shaped, each having a foot and an outer portion, said inner concave face has a plurality of grooves formed therein, said outer convex face includes an inner band having a plurality of slots formed therein, and each of said vanes is mounted within said coolant packs such that said foot engages one of said grooves and said outer portion engages one of said slots.

4. The frozen dessert maker of claim 2 further comprising:
- a lower stud extending upwardly from the base and having an upper edge below said platform and spaced radially from the output shaft; and
- an upper stud extending downwardly from said platform to a point below said upper edge of said lower stud and located at approximately the same radial distance from the output shaft whereby said upper stud slidably engages said lower stud during operation of the dessert maker and thereby imparts a circular movement of the can about the output shaft with a reciprocal rotational motion superimposed thereon.

5. The frozen dessert maker of claim 1 wherein said means for clamping said coolant packs to the can comprises a strap and a draw pull catch and strike.

6. The frozen dessert maker of claim 1 wherein each said coolant pack further comprises:
- a pair of side walls extending between said inner concave face and said outer convex face thereof;
- a top wall and a bottom wall each extending from said inner concave face to said outer convex face; and
- a flange abutting said outer concave face and forming an integral part of said top wall, bottom wall and side walls.

7. The frozen dessert maker of claim 6 wherein said outer convex face comprises:
- a substantially rectangular sheet of a plastic material abutting said flange on a side and completely covering a space defined by said inner concave face, top wall, bottom wall and side walls;
- a substantially rectangular frame in registry with said flange and abutting said sheet on another side opposite said side abutting said flange; and
- means for clamping said frame to said flange to form a leak-proof seal between said sheet and said top wall, bottom wall and side walls.

8. The frozen dessert maker of claim 7 wherein said outer convex face further comprises a silicon rubber gasket located between said flange and said sheet.

9. The frozen dessert maker of claim 6 wherein said top wall, bottom wall, side walls and flange are integral and are made of aluminum.

10. A frozen dessert maker comprising:
- a motor having a rotatable output shaft;
- a drive train attached to said output shaft and having a second shaft parallel to and off-set from said output shaft whereby rotation of said output shaft causes said second shaft to orbit about the output shaft;
- a cylindrical can having a central axis coaxial with said second shaft and rotatably mounted thereon;
- a dasher rigidly mounted on said second shaft within said can;
- a plurality of coolant packs for containing a coolant slurry, each having an inner concave face and an outer convex face and being positioned concentrically about said can such that said inner concave face of each said pack matingly engages a portion of said can;
- a plurality of vanes attached to said inner concave face and extending toward said outer convex face of each said pack;
- means extending about said packs adjacent said outer convex faces thereof for clamping said packs to said can;
- a platform rotatably mounted on said drive train in supporting relation with said can and said coolant packs;
- a plurality of arms extending upwardly from the outer periphery of said platform for supporting said clamping means;
- an upper stud extending downwardly from said platform in radially offset relation with said output shaft; and
- a basin rigidly positioned between said motor and said platform and having a lower stud extending upwardly therefrom and positioned thereon to act as a bearing surface for said upper stud such that rotation of said second shaft about said output shaft imparts a circular movement to said can and coolant packs about said output shaft with a reciprocal rotational movement superimposed thereon.

11. The frozen dessert maker of claim 10 wherein each said coolant pack further comprises:
- a pair of side walls extending between said inner concave face and said outer convex face thereof;
- a top wall and a bottom wall, each extending from said inner concave face to said outer convex face; and
- a flange abutting said outer concave face and forming an integral part of said top wall, bottom wall, and side walls.

12. The frozen dessert maker of claim 11 wherein said drive train includes:
- a circular lower cup having a lower floor with a first hole located at an off-center position on said lower floor receiving said output shaft of said motor and means for locking said output shaft within said first hole,
- an upper cup nested within said lower cup and having an upper floor with a second hole in registry with said first hole receiving said output shaft therein;
- a block nested within said upper cup and having cruciform members and a threaded central opening therethrough receiving a lower end of said second shaft;
- a plurality of raised lugs positioned on said upper floor of said upper cup between said cruciform members to form a driving connection between said block and said upper cup;
- a flanged bolt having a central passage through which is journaled said second shaft, and including a flange member which rests on the bottom of said can and a threaded member which passes through said can bottom;
- an inverted cup member having a threaded opening in the bottom thereof which engages said threaded member of said flanged bolt thereby clamping the threaded member to said can and bottom, said platform having a central opening for receiving the outer wall of said inverted cup member in nested relation to position said can on said platform; and
- a head bolt threaded onto an upper end of the second shaft.

13. The frozen dessert maker of claim 12 wherein said dasher has a base member with a recess shaped to receive said head bolt.

* * * * *